(12) United States Patent
Hu et al.

(10) Patent No.: US 10,089,844 B2
(45) Date of Patent: Oct. 2, 2018

(54) CAMERA WITH WIRELESS POWER TRANSMITTER

(71) Applicant: Avigilon Corporation, Vancouver (CA)

(72) Inventors: Yanyan Hu, Woburn, MA (US); Pietro Russo, Natick, MA (US); Mahesh Saptharishi, Sudbury, MA (US)

(73) Assignee: Avigilon Corporation, Vancouver (CA)

( * ) Notice: Subject to any disclaimer, the term of this patent is extended or adjusted under 35 U.S.C. 154(b) by 148 days.

(21) Appl. No.: 15/178,472

(22) Filed: Jun. 9, 2016

(65) Prior Publication Data

US 2017/0358185 A1 Dec. 14, 2017

(51) Int. Cl.
| | |
|---|---|
| *G08B 13/196* | (2006.01) |
| *H04N 7/18* | (2006.01) |
| *H04N 5/232* | (2006.01) |
| *G07C 9/00* | (2006.01) |
| *H02J 50/12* | (2016.01) |
| *H04W 4/80* | (2018.01) |

(52) U.S. Cl.
CPC ..... *G08B 13/1966* (2013.01); *G07C 9/00087* (2013.01); *G08B 13/19656* (2013.01); *H02J 50/12* (2016.02); *H04N 5/23241* (2013.01); *H04N 7/183* (2013.01); *H04W 4/80* (2018.02)

(58) Field of Classification Search
CPC . G08B 13/1966; H02J 50/12; G07C 9/00087; H04N 5/23241; H04N 7/183; H04W 4/008
See application file for complete search history.

(56) References Cited

U.S. PATENT DOCUMENTS

| | | | | |
|---|---|---|---|---|
| 2005/0207487 A1* | 9/2005 | Monroe | ........... | G08B 13/19628 375/240.01 |
| 2006/0078047 A1* | 4/2006 | Shu | ..................... | G06F 17/3079 375/240.01 |
| 2008/0084474 A1* | 4/2008 | Bergstrom | ....... | G08B 13/19619 348/143 |
| 2013/0050889 A1* | 2/2013 | Hwang | ................... | H02J 17/00 361/86 |
| 2017/0323381 A1* | 11/2017 | Todd | ..................... | G06Q 40/02 |

* cited by examiner

*Primary Examiner* — Michael E Teitelbaum
(74) *Attorney, Agent, or Firm* — Daniel Hammond (57) ABSTRACT

A camera device includes a camera module that captures a scene corresponding to a field of view of the camera module. A wireless power transmitter of the camera devices transmits wireless power to a battery-powered external sensing device. A transceiver is further operable for receiving from the external sensing device sensed data. A network module transmits the image and sensed data to an external networked device. A power supply receives power over a wired connection and supplies power to the camera module, transceiver, networking module and wireless transmitter. The external sensing device may be an access control device that includes a sensor for sensing the presence of a machine readable toke and reading an identifier of the physical token. The access control device further includes a lock controller for selectively locking and unlocking a physical lock.

18 Claims, 7 Drawing Sheets

CAMERA WITH WIRELESS POWER TRANSMITTER

FIELD

The present subject-matter relates to a camera and a system integrating the camera, and more particularly to a camera with a wireless power transmitter for powering an external sensing device.

BACKGROUND

A camera may be used to acquire information about a place or an object. The information is visual image data generated by the camera corresponding to the scene falling within the field of view of the camera.

A sensing device may be used to acquire other information about a place or an object. Such information may be conditions sensed by the sensing device, such as one or more environmental conditions surrounding the sensing device.

An access control device is a specific type of sensing device that senses whether an identifying token has been presented to the access control device and whether that token is authenticated.

In some situations, the camera and/or the sensing device may be connected to a data network so that image data and/or sensing data may be received by other devices connected to the network.

SUMMARY

The embodiments described herein provide in one aspect a combined video surveillance and access control system comprising an access control device and a camera device. The access control device includes a lock controller for selectively controlling actuation of a physical lock between a locked state and an unlocked state, a sensor operable for sensing an occurrence of a presence of a machine readable physical token and for reading an identifier of the physical token, a transceiver for wirelessly transmitting access data generated based on the presence of the physical token and the identifier read by the sensor, at least one battery for supplying power to the lock controller, the sensor and the transceiver, and a wireless power receiver operable for receiving wirelessly transmitted power and to charge the at least one battery using the received power. The camera device includes at least one camera module operable for capturing a scene corresponding to a field of view of the camera and for generating image data of the captured scene, a transceiver operable for receiving the access data transmitted from the battery-powered physical access control device, a networking module operable for transmitting the image data and access data to an external networked device, a wireless power transmitter operable for transmitting power wirelessly to the wireless power receiver of the access control device, and at least one power supply operable for receiving power over a wired connection and supplying power to the camera, the transceiver, the network module and the wireless power transmitter.

The embodiments described herein provide in another aspect a camera device. The camera device includes at least one camera module operable for capturing a scene corresponding to a field of view of the camera module and for generating image data of the captured scene, at least one wireless power transmitter operable for transmitting wireless power to a battery-powered external sensing device, a transceiver operable for receiving from the external sensing device sensed data pertaining to at least one condition sensed by the external sensing device, a networking module operable for transmitting the image data and data pertaining to the at least one sensed condition to an external networked device, and at least one power supply operable for receiving power over a wired connection and supplying power to the camera module, the transceiver, the networking module and the wireless power transmitter.

According to some example embodiments, the access control device further comprises a lock actuator being controlled by the lock controller, said actuator being powered by the at least one battery and being operable for selectively actuating the physical lock between the locked state and the unlocked state.

According to some example embodiments, the networking module transmits the image data and the access data to the external networked device over the wired connection.

According to some example embodiments, the external networked device comprises an access control management system and wherein the access control device is in communication with the control management system only via the camera device.

According to some example embodiments, the access control device is free of a wired network connection with another network device.

According to some example embodiments, image data generated at a given time is logically associated to the access data generated at the same time by the access control device when transmitting the image data and the access data to the external networked device.

According to some example embodiments, the camera device further comprises a video analytics module operable for performing video analytics on the image data and determining an occurrence of a video analytics event based on a combination of one or more results of the performed video analytics and access data received from the access control device.

According to some example embodiments, the transceiver of the camera device is further operable for receiving information pertaining to a battery status of the at least one battery of the access control device and the wireless power transmitter is operable for adjusting the transmission of wireless power to the access control device based on the received information pertaining to the battery status.

According to some example embodiments, an effective powered space of the wireless power transmitter of the camera device substantially overlaps with the field of view of the camera module.

According to some example embodiments, the camera module is pivotable and wherein the wireless power transmitter pivots with the camera module to maintain overlap of the power coverage cone with the field of view.

According to some example embodiments, an asset to which access is being controlled by the access control device is viewable within the field of view of the camera module.

According to some example embodiments, the camera device comprises a plurality of wireless power transmitters, with each transmitter being operable for directionally transmitting wireless power. According to some example embodiments, at least one of the plurality of wireless power transmitters is pivotable to change the space occupied by its power coverage cone.

BRIEF DESCRIPTION OF THE DRAWINGS

The detailed description refers to the following figures, in which.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

"Battery" herein refers to not only a device in which chemical energy is converted into electricity and used as a source of power, it also refers to any alternatively suitable energy storage devices such as, for example, a capacitor of suitable size and construction.

"Image data" herein refers to data produced by a camera device and that represents images captured by the camera device. The image data may include a plurality of sequential image frames, which together form a video captured by the camera device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCbCr 4:2:2, YCbCr 4:2:0 images. It will be understood that "image data" as used herein can refer to "raw" image data produced by the camera device and/or to image data that has undergone some form of processing. It will be further understood that "image data" may refer to image data representing captured visible light in some examples and may refer to image data representing captured depth information and/or thermal information in other examples.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting objects, tracking and/or classifying objects located within the captured scene represented by the image data. The processing of the image data may cause modified image data to be produced, such as compressed (ex: lowered quality) and/or re-encoded image data. The processing of the image data may also cause additional information regarding the image data or objects captured within the images to be output. For example, such additional information is commonly understood as metadata. The metadata may also be used for further processing of the image data, such as drawing bounding boxes around detected objects in the image frames.

Figure 1:
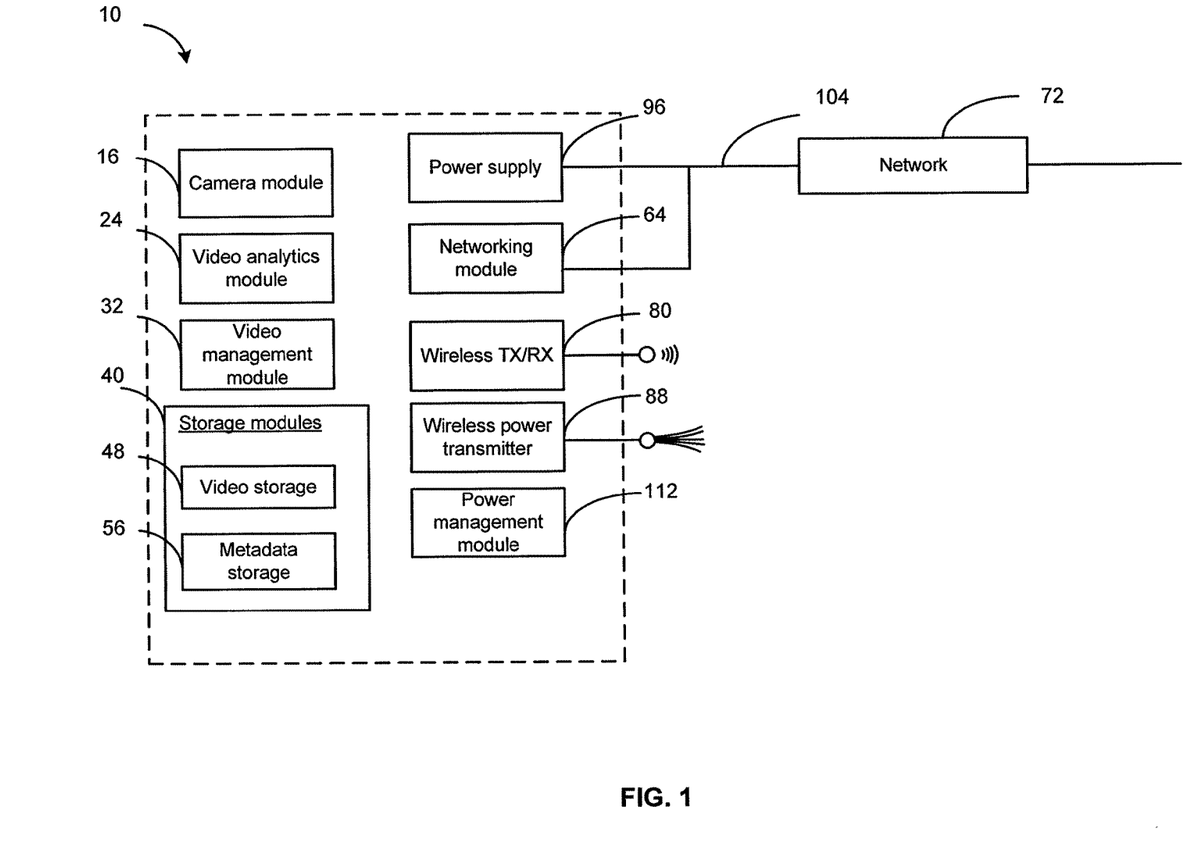
FIG. 1 illustrates a block diagram of a camera device according to an example embodiment.

Referring now to FIG. 1, therein illustrated is a block diagram of a camera device 10 according to an example embodiment. The camera device 10 is illustrated according its operational modules. An operational module of the camera device 10 may be a hardware component. An operational module may also be implemented in hardware, software or combination of both.

The camera device 10 includes one or more processors, one or more memory devices coupled to the processors and one or more network interfaces. The memory device can include a local memory (e.g. a random access memory and a cache memory) employed during execution of program instructions. The processor executes computer program instructions (e.g., an operating system and/or application programs), which can be stored in the memory device.

In various embodiments the processor may be implemented by any processing circuit having one or more circuit units, including a digital signal processor (DSP), graphics processing unit (GPU) embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device may be implemented together within a system on a chip (SOC). For example, the processor, the memory device and the network interface may be implemented within a SOC. Furthermore, when implemented in this way, both a general purpose processor and DSP may be implemented together within the SOC.

The camera device 10 includes at least one camera module 16 (for convenience of illustration only one is shown in the illustrated example embodiment) that is operable to capture a plurality of images and produce image data representing the plurality of captured images. The camera module 16 generally refers to the combination of hardware and software sub-modules that operate together to capture the plurality of images of a scene. Such sub-modules may include an optical unit (e.g. camera lens) and an image sensor. In the case of a digital camera module, the image sensor may be a CMOS, NMOS, or CCD type image sensor.

The lens and sensor combination defines a field of view. When positioned at a given location and according to a given orientation, the camera module 16 is operable to capture the real-life scene falling within the field of view of the camera and to generate image data of the captured scene.

The camera module 16 may perform some processing of captured raw image data, such as compressing or encoding the raw image data.

The camera device 10 may optionally include a video analytics module 24. The video analytics module 24 receives image data from the camera module 16 and analyzes the image data to determine properties or characteristics of the captured image or video and/or of objects found in a scene represented by the image or video. Based on the determinations made, the video analytics module 24 may further output metadata providing information about the determinations. Examples of determinations made by the video analytics module 24 may include one or more of foreground/background segmentation, object detection, object tracking, object classification, virtual tripwire, anomaly detection, facial detection, facial recognition, license plate recognition, identifying objects "left behind", monitoring objects (i.e. to protect from stealing), and business intelligence. However, it will be understood that other video analytics functions known in the art may also be implemented by the video analytics module 24.

The camera device 10 may optionally include a video management module 32. The video management module 32 receives image data and performs processing functions on the image data related to video transmission, playback and/or storage. For example, the video management module 32 can process the image data to permit transmission of the image data according to bandwidth requirements and/or capacity. The video management module 32 may also process the image data according to playback capabilities of a client device that will be playing back the video, such as processing power and/or resolution of the display of the client device. The video management 32 may also process the image data according to storage capacity in the camera device 10 or in other devices connected to the camera device 10 over a network.

The camera device 10 may optionally include a set 40 of storage modules. For example, and as illustrated, the set 40 of storage modules include a video storage module 48 and a metadata storage module 56. The video storage module 48 stores image data, which may be image data processed by the video management module 32. The metadata storage module 56 stores information data outputted from the video analytics module 24.

It will be understood that while video storage module 48 and metadata storage module 56 are illustrated as separate modules, they may be implemented within a same hardware storage device whereby logical rules are implemented to separate stored video from stored metadata. In other example embodiments, the video storage module 48 and/or the metadata storage module 56 may be implemented within a plurality of hardware storage devices in which a distributed storage scheme may be implemented.

The storage modules 48, 56 provide non-transitory storage of image data and/or metadata. In other example embodiments wherein storage modules 48, 56 are not provided, image data generated by the camera module 16 and metadata generated by the video analytics module 24 may be immediately transmitted to an external device over a network.

The camera device 10 includes a networking module 64 operable for providing data communication with another device over a network 72. The network 72 may be a local area network, an external network (e.g. WAN, Internet) or a combination thereof. In other examples, the network 72 may include a cloud network.

The camera device 10 further includes a transceiver 80 operable for communicating wirelessly with another device. The wireless communication may be provided according to any protocol known in the art, such as Bluetooth™, Wi-Fi™, ZigBee™ or cellular communication protocols.

In some examples, the transceiver 80 is a short-range, low-power transceiver. A short-range, low-power transceiver may be useful for reducing power consumption of the external device with which the camera device 10 is communicating. For example, the transceiver 80 that is short-range may have a communication range of less than about 10 m. For example, the transceiver 80 that is low-power may have a power consumption of less than about 0.5 Watts. A short-range, low-power transceiver may implement a low-energy Bluetooth™ or low-energy Wi-Fi™ protocol known in the art.

The camera device 10 further includes a wireless power transmitter 88 that is operable for transmitting power wirelessly to an external electrical load. The external electrical load may be an energy storage device, such as at least one battery or capacitor. For example, power may be transferred by magnetic fields in which one or more coils of wires in the wireless power transmitter 88 is coupled by magnetic induction with a cooperating coil in the external device that is being powered by the wireless power. The inductive coupling between the wireless power transmitter 88 and a cooperating device receiving the power may be resonant inductive coupling or electrodynamic induction. It will be understood that the wireless power transmission is not limited to non-radiative techniques. In some examples, longer range techniques may be used, such as power beaming based on microwaves or lasers.

The camera device 10 further includes a power supply 96 operable for supplying electrical power to the hardware components of the camera device 10, such as those implementing the camera module 16, transceiver 80, networking module 64 and wireless power transmitter 88.

In some examples, the power supply 96 receives electrical power from a power source over a wired connection. The power source may be mains electricity (ex: 110V/220V AC), which may be converted to a supply suitable for the camera device 10 (ex: converting to DC, rectifying to a lower voltage). In some alternative examples, the power source may be an intermediate device that supplies power in addition to performing another function, such as processing or networking. In yet further alternative examples, the power supply may be supplying power in a sustainable manner based on, for instance, solar power technology or power received wirelessly from another device in communication with the camera device 10.

In one example embodiment, power may be supplied to the power supply 96 over a connection that is also providing data communication. For example, power may be supplied to the power supply 96 by power over ethernet (POE), wherein the cable connected to the networking module 64 for network data communication is also used for supplying power to the power supply. As illustrated, the same cable 104 that is connected to the network (e.g. connected to a network switch or router) is also connected to the power supply 96.

The camera device 10 may further include a power management module 112 that is operable for managing the supply of power from the power supply 96 to various hardware components of the camera device 10. The power management module 112 may manage the power being consumed by the wireless power transmitter 88 separately from management of power being consumed by other components of the camera device 10. The power management module 112 may further control the priority of providing power to various modules of the camera device 10. This prioritization in the case of high power demand from various modules, which may otherwise cause system overload.

For example, a wireless power transmitter power management submodule may control the power level of the wireless power transmitted from the wireless power transmitter 88. The power level may be varied according to characteristics of an external device receiving the wireless power. Such characteristics may include one or more of the distance of the external device from the camera device 10, the average power requirement of the external device, the instantaneous power requirement of the external device, and the current battery status of the external device.

The power level may also be varied according to environmental factors, such as time of day, location, and number of proximately located devices. For example, where the camera device 10 is used to for charging the external device, the wireless power transmitter power management submodule may choose to transmit wireless power for charging during off-peak hours.

The power level may also be varied according to power load requirements from other components of the camera device 10. For example, during periods when other components of the camera device 10 experience heavy load, the power management module 112 may supply less or no power to the wireless power transmitter. These periods may occur when the camera device 10 has to handle a large amounts of data, such as transferring or backing up data stored within the storage module 40.

The example camera device 10 is suitable for use in conjunction with an external device that requires data communication with another device over a network and that would benefit from receiving wirelessly transmitted power. The camera device 10 can provide network connectivity to the external device via data communication provided between the wireless transceiver 80 of the camera device 10 and a corresponding wireless transceiver of the external device. The network connectivity is further provided through the connection of the networking module 64 of the camera device 10 with the network 72. Accordingly, the external device may be in communication another network node connected to the network 72 only via the camera device 10 and without requiring some form of wired and/or wireless connection from the external device to the network 72.

The camera device 10 can further provide a continued power source for the external device via wireless power transmitter 88 transmitting power to the external device. The external device may be battery-operated and the power transmitted wirelessly from the camera device 10 may be used to charge at least one battery of the external device. Accordingly, the external device may operate without having to receive power over a wired power cable. Furthermore, even where the external device may be fully battery-operated, the providing of wireless power from the camera device 10 to the external device to charge the battery of the external device may eliminate, or reduce the frequency, of having to change the battery.

In some example embodiments, the power output from the wireless power transmitter 88 may be variably controlled. For example, the level of power output may be adjusted according to the power consumption of the external device receiving the wirelessly transmitted power. The level of power out may also be adjusted based on one or more parameters of the deployment of the camera device 10 with the external device, such as the distance therebetween. The power output from the wireless power transmitter 88 may be adjusted so that the level of wireless power received at the external device corresponds with a power requirement of the external device, such as an average power requirement of the external device. The power output may also be adjusted based on a change in power requirement of the external device. However, the power output from the wireless power transmitter 88 may be throttled by the power management module 112 to ensure continued proper functioning of the camera device 10. In some example embodiments, the wireless power transmitter 88 may implement trickle charging or slow charging of the external device.

In some example embodiments, the wireless power transmitter 88 may be chosen to provide at least 3 watts power to a power-receiving external device located at a distance of at most 10 meters from the camera device 10. For example, such a power output would effectively charge a depth sensor or typical PIR motion sensor.

In other example embodiments, the wireless power transmitter 88 may be chosen to provide substantially less power, such as about 0.2 mW of power at a distance of at most 10 meters from the camera device 10. This level of power output is suitable for external devices that are typically on standby, such as a smoke alarm.

Figure 2:
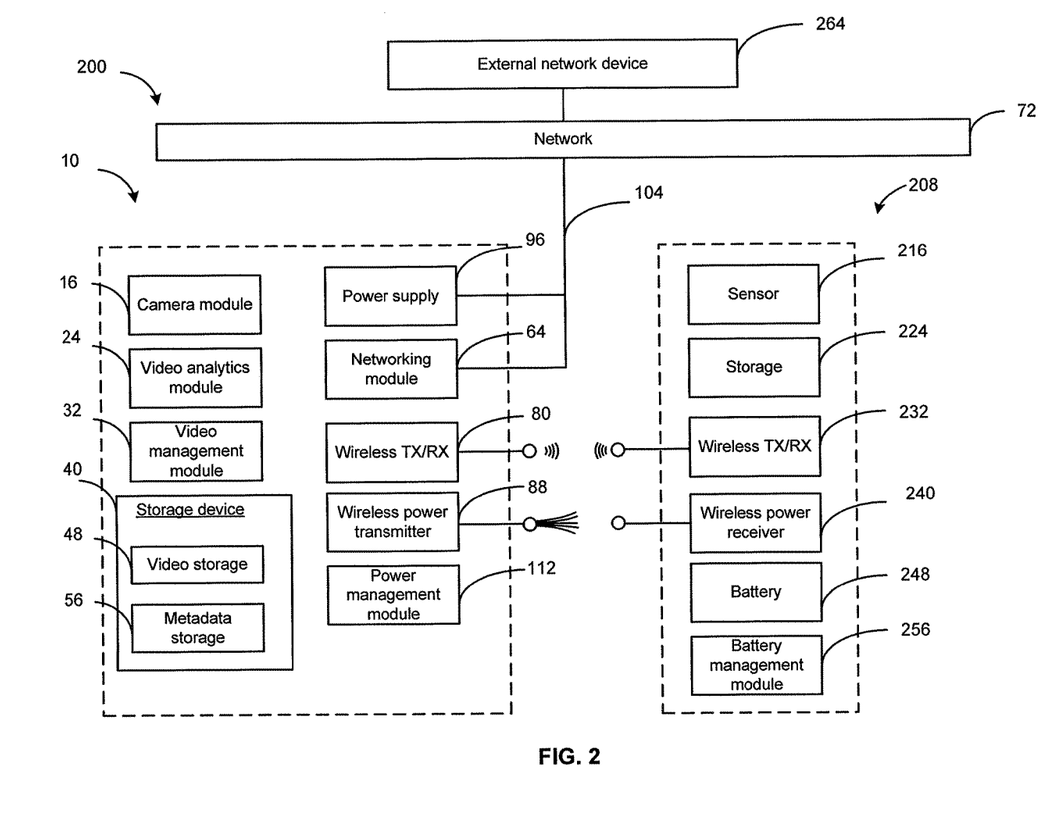
FIG. 2 illustrates a block diagram of a combined system according to an example embodiment having an example camera device and an example sensing device.

Referring now to FIG. 2, therein illustrated is a block diagram of a combined system 200 according to one example embodiment having a camera device 10 and a sensing device 208.

The sensing device 208 includes a sensor 216 for sensing a condition. In some example embodiments, the sensor 216 may be any one of an environmental sensor for sensing an environmental condition in proximity of the sensing device. For example, the sensor 216 may be one of a thermometer, humidity sensor, air quality sensor, smoke detector, pressure sensor, microphone, water leak sensor, geiger counter, and seismic vibration sensor.

In some example, the sensor 216 may be operable to sense a security-related condition. In one example, the sensor 216 may be a smoke detector for detecting the presence of smoke or fire. In another example, the sensor 216 may be an occupancy sensor (e.g. passive infra-red) for detecting the presence of an object. In yet another example, the sensor 216 may be an intrusion sensor (e.g. magnetic reed switches) for detecting intrusion into an area. Other examples of sensors 216 for sensing a security-related condition may include one or more of a door open sensor, gunshot detector, glass break sensor, motion sensor, smoke alarm and car alarm.

The sensor 216 generates sensed data that contains information pertaining to the sensed condition.

The sensing device 208 may include a storage module 224. The storage module 224 may be operatively connected with the sensor 216 to receive sensed data and store the sensed data. The storage 224 may also store one or more sensing rules. The sensor 216 may implement sensing of the condition differently based on applicable sensing rules. For example, the rules may cause the sensor 216 to cease sensing during given periods of the day and carry out sensing at other periods of the day.

The sensing device 208 includes a transceiver 232 operable for providing data communication with the camera device 10 via the transceiver 80. The transceiver 232 of the sensing device 208 may implement a wireless communication protocol that is compatible with the communication protocol implemented by the transceiver 80 of the camera device 10. For example, the transceiver 232 may also be a short-range, low-power transceiver.

Sensed data generated by the sensor 216 can be transmitted from the sensing device 208 using its transceiver 232 and received at the camera device 10 using its transceiver 80. The sensed data may be further transmitted to external network device 264 from the camera device 10 over the network 72.

The sensing device 208 may further receive commands from the camera device 10. The commands may have been initially transmitted from the external network device 264 to the camera device 10 via the network 72 and the networking module 210 of the camera 10. For example, the commands may be for controlling the sensing device 208, such as commands for changing sensing rules applied to the sensing device 208.

The sensing device 208 further includes a wireless power receiver 240 that is operable for receiving power transmitted wirelessly from the wireless power transmitter 88 of the camera device 10. The wireless power receiver 240 is configured to be compatible with the wireless power transmitter 88 of the camera device 10. For example, the wireless power receiver 240 includes one or more coil of wires in which a flow of electrical current is induced by the wireless power transmitted from the camera device 10.

The sensing device 208 may further include at least one battery 248 or other suitable form of power storage device for supplying power to one or more components of the sensing device 208. The at least one battery 248 may supply power to the sensor 216, and the transceiver 232. The at least one battery 248 is rechargeable using power transmitted wirelessly from the camera device 10 and received by the wireless power receiver 240.

The sensing device 208 may further include a battery management module 256. The battery management module 256 operates to manage charging of the at least one battery 248 using the power received by the wireless power receiver 240.

In one example embodiment, the battery management module 256 may sense the charge level of the at least one battery 248 and implements charging of the battery 248 when the charge level falls below a predetermined level.

In another example embodiment, the battery management module 256 may implement charging of the battery 248 any time wireless power is available from the wireless power receiver 240. The battery management module 256 may be further operable to implement trickle charging or slow charging of the battery 248.

In yet another example embodiment, the battery management module 256 may be further operable to sense the battery charge level and to communicate the charge level to the camera device 10 using the wireless transceiver 232. The camera device 10 may be configured to transmit wireless power only when it receives an indication that the charge level of the at least one battery 248 of the sensing device 208 has fallen below a predetermined level. Additionally, or alternatively, the battery management module 256 may transmit, using the wireless transceiver 232, a request to the camera device 10 to begin wireless transmission of power to the sensing device so that the power can be used for charging the at least one battery.

Continuing with FIG. 2, the camera device 10 is operable to transmit over the network 72 image data and sensed data received from the sensing device 208. Accordingly, the camera device 10 acts as a gateway to the network 72 for the sensing device 208. The camera device 10 may transmit the image data and the sensed data to their respective destinations over the network 72.

In various example embodiments, the camera device 10 may be configured to transmit image data and the sensed data received from the sensing device 208 to the same destination networked device 264 over the network 72. For example, the destination networked device 264 may be a server that processes or manages the image data and/or the sensed data. When being transmitted to the same destination networked device, image data that is captured by the camera module 16 at a given time is logically associated with sensed data pertaining to one or more conditions sensed by the sensor 216 at the same time. "Logically associated" herein refers to an association in which knowledge of the relevant image data allows retrieval of its logically associated sensed data and vice versa. For example, the image data and its corresponding data may both include a time stamp, which provides the logical association.

According to various example embodiments wherein the camera device 10 is used in a video surveillance application to visually monitor an area or asset, the condition sensed by the sensing device 208 may provide information about the area or asset, which may provide enhanced monitoring. For example, the sensed condition may be used to confirm or provide further information regarding an event that is captured by the camera device 10. This information may be also be used to confirm or improve certainty of a determination made by the video analytics module 24.

In some example embodiments, the video analytics module 24 may determine properties or characteristics of the captured image or video and/or of objects found in the scene represented by the image or video based on a combination of analysis of the image data and one or more relevant conditions sensed by the sensing device 208. Relevant conditions sensed by the sensing device 208 may be conditions sensed during a time period corresponding to the time period of the image data being analyzed.

According to various example applications, the sensing device 208 is located in proximity of the camera device 10, such as within the same physical area. For example, the sensing device 208 may be located such that conditions sensed by the sensing device 208 are relevant to the image data captured by the camera device 10. Accordingly, the sensed data may serve to enhance the monitoring performed using the camera device 10. It will be appreciated that the proximity of the camera device 10 with the sensing device 208 allows for effective wireless transmission of power from camera device 10 to the sensing device 208 and for effective wireless data communication between the camera device 10 and the sensing device 208. This allows the sensing device 208 to operate fully wirelessly (i.e. without requiring a wired connection for data communication with an external device and for receiving power). It will be further appreciated that even in other examples where the sensing device 208 generates sensed data that is not pertinent to the image data captured by the camera device 10, the interaction between the camera device 10 and the sensing device 10 allows the sensing device 208 to operate fully wirelessly.

Figure 3:
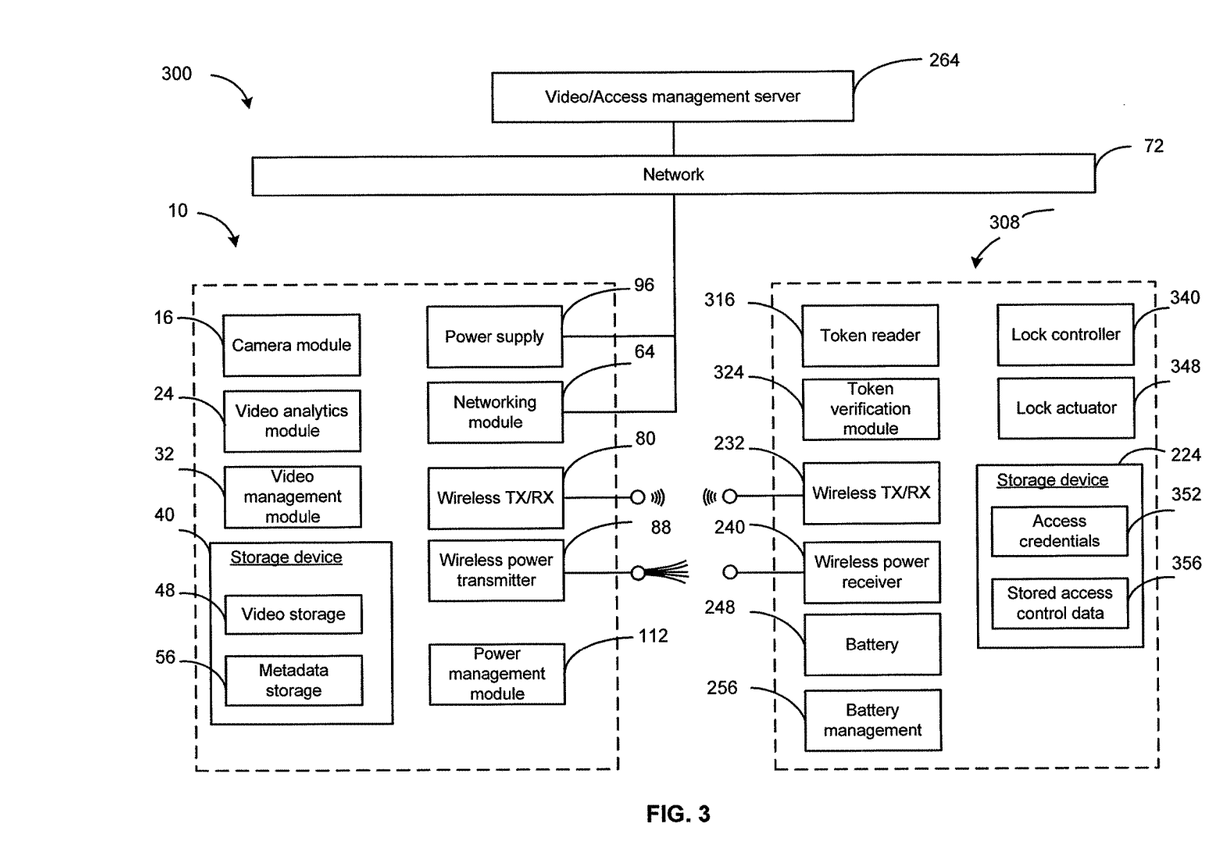
FIG. 3 illustrates a block diagram of a combined video surveillance and access control system according to one example embodiment having an example camera device and an example access control device.

Referring now to FIG. 3, therein illustrated is a block diagram of a combined video surveillance and access control system 300 according to one example embodiment. It will be understood that the combined video surveillance and access control system 300 is an example of the combined system 200 in which the sensing device 208 is an access control device 308.

Access control herein refers to management of physical access to a protected asset. In one example, the protected asset may be an access point (e.g. door, gate) to a physical area (e.g. building, room). Accordingly, the access control device 308 controls allowing or disallowing access to the physical area, such as by selectively locking or unlocking a door or gate.

In another example, the protected asset may be a locked item, such as a safe, vehicle, or computer with physical security device. Accordingly, the access control device 308 controls permitting access to contents of the locked item, such as by selectively locking or unlocking a safe door, car door, or allowing access to the computer.

Continuing with FIG. 3, the access control device 308 includes a token reader 316, which acts as the sensor of the access control device 308. The token reader 316 is operable to sense the occurrence of the presence of a machine readable physical token and to read an identifier of the physical token. The identifier may be a feature of the physical token or a code stored on the physical token that identifies the physical token. The identifier of a physical token may uniquely identify that physical token.

In one example, the physical token may be a discrete portable object, such as a RFID card or fob, RFID-enabled device, magnetic card, etc. The discrete portable object may have stored thereon an identification code that identifies the object. The discrete portable object may be carried by a person and presented to the access control device 308 for identifying that person. The token reader 316 of the access control device 308 detects when the discrete portable object is presented by the person, which results in the sensing of an occurrence of a presence of the physical token. The token reader 316 of the access control device 308 further reads the identification code stored on the discrete portable object.

In another example, the physical token may be a biometric token of a person. Accordingly, features of biometric token also acts as the identifier. The biometric token may be one of a face, palm print, fingerprint, hand geometry, iris, voice, etc. The token reader 316 of the access control device 308 detects when the person presents their relevant biometric token to the token reader 316, which results in the sensing of an occurrence of a presence of the physical token. The token reader 316 further recognizes properties of the biometric feature, which acts as the identifier of that biometric token and of the person to whom the biometric token belongs.

The access control device 308 further includes a token verification module 324. The token verification module 324 verifies whether an identity associated with the identifier of a physical token has been granted access to the asset being protected. If the identity has been authenticated, the access control device 308 acts to grant access. If the identity has not been authenticated, the access control device 308 acts to deny access.

For example, and as illustrated, the access control device 308 includes a storage device 224 in which are stored access credentials 352. The stored access credentials may include user identities each corresponding to a real-world users. The stored access credentials may further include token identifiers. A user identity may be associated to one or more token identifiers. The stored access credentials may further include access rules. Each token identifier and/or user identity may be further associated to a set of access rules. The access rules define the parameters by which a token identifier or a user identity is granted access to a given asset. For example, the access rules may define the time periods during which a particular token identifier or user identity is granted access to a particular asset.

The token verification module 324 receives the identifier read by the token reader 316 from a physical token that is presented and verifies whether the access rules associated to that identifier or the user identity associated to that identifier grants access to that identifier. The identity associated to the identifier is authenticated if the associated rules grant access. The identity associated to the identifier is not authenticated if the token verification module 324 fails to find rules that grant access to the particular identifier.

The access control device 308 further includes a lock controller 340, which is operable to selectively control actuation of a lock between a locked state and an unlocked state. In the locked state, the lock prevents access to the protected asset. In the unlocked state, the lock is in a position where access to the protected asset is granted. For example, the lock is a physical lock that physically blocks or grants access to the protected asset.

The lock controller 340 may receive an authenticated signal from the token verification module 324 each time that a token identifier read by the token reader is authenticated. In response to receiving an authentication signal, the lock controller 340 controls a lock actuator 348 to actuate a physical lock (not illustrated) to an unlocked position. After the lock is actuated to the unlocked position, the lock actuator 348 may further control the lock actuator 348 to further actuate the physical lock to the locked position after some time has passed or an event has occurred (ex: the access door being closed.)

In the illustrated example, the lock actuator 348 is integrated in the access control device 308. The lock controller 340 and the lock actuator 348 may be combined into an integrated component.

In other examples, the lock actuator 348 may be external to the access control device 308. This configuration may be useful because the access control device 308 may then be used with a variety of different locks and their corresponding lock actuator 348 by sending an appropriate control signal (lock/unlock) from the lock controller 340 of the access control device 308 to the external lock actuator 348.

Continuing with FIG. 3, token reader 316 and the token verification module 324 may operate together to generated access data pertaining to presence of physical token and identifier of the physical token read by the token reader 316 and the verification of token identifier by the 324. The access data may be stored as stored access data 356 within the storage device 224.

The access control device 308 includes the wireless transceiver 232 that is operable for providing data communication with the camera device 10 via the transceiver 80. Access data generated by the token reader 316 and the token verification module 324 may be transmitted via the wireless power transceiver 232 to the camera device 10. The camera device 10 may also transmit to the access device 308, from wireless transceiver 80 to wireless transceiver 232, commands for configuring the access control device 308. For example, the commands may include one or more updates to the access rules applied for authenticating by the token verification module 324 token identifiers read by the token reader 316. The one or more updates may include addition or removal of user identities and/or token identifiers that are granted access to the protected asset or changes to access rules associated to one or more user identities and/or token identifiers.

The access device 208 also includes a wireless power receiver 240, at least one battery 248 and a battery management module 256. The description provided elsewhere herein regarding the wireless power receiver 240, at least one battery 248 and battery management module 256 of the sensing device 208 is also applicable to the wireless power receiver 240, at least one battery 248 and battery management module 256 of the access control device 308.

The camera device 10 is operable to transmit over the network 72 image data generated by the video capture module 208 and access data received from the access control device 308. Accordingly, the camera device 10 acts as a gateway to the network 72 for the access control device 308. The camera device 10 may transmit the image data and the access data to their respective destinations over the network 72.

In various example embodiments, the camera device 10 may be configured to transmit image data and the access data received from the access control device 208 to the same destination networked device 264 over the network 72. For example, the destination networked device 264 may be a server that processes or manages the image data and/or the access data. When being transmitted to the same destination networked device, image data that is captured by the camera module 16 at a given time is logically associated with access data generated at the same time. For example, the image data and its corresponding access data may both include a time stamp, which provides the logical association.

According to various example embodiments, the camera device 10 may be used in a video surveillance application to visually monitor an area or asset and the access control device 308 may be used in an access control application to grant, track and monitor access of users to protected assets. In these examples, the access data from the access control device 308 may be used to enhance the surveillance application. For example, where the camera device 10 detects a person in a monitored area, access data from a nearby access control device 308 may be analyzed to determine the physical token used by that person to enter the monitored area. Conversely, where the access control device 308 reads a physical token that is assigned to a particular person, image data from the camera device 10 may be analyzed to verify whether the person using the physical token is actually the assigned person or whether it is being used by someone else that may be an intruder. In some examples, the video surveillance application and the access control management application may be combined and both the image data and access data are used together. For example, the destination network device 264 may perform at least part of the combined application.

In some example embodiments, the video analytics module 24 may determine properties or characteristics of the captured image or video and/or objects found in the scene based on a combination of analysis of image data and access data received from the access control device 308. Relevant access data may be data generated during a time period corresponding to the time period of the image data being analyzed. For example, the access data may be used to confirm or improve certainty of a determination made by the video analytics module 24.

According to various example applications, the camera device 10 and the access control device 308 are deployed together such that the protected asset to which access is being controlled by the access control device 308 is located within scene being captured within the field of view of a given camera device 10. Accordingly, the access data may serve to enhance the monitoring performed by the camera device 10. Conversely, image data generated by the camera device 10 may serve to enhance access control being performed by the access control device 308.

It was observed that a camera device 10 and an access control device 308 are often deployed in proximity of one another. It was further observed that the power requirements of an access control device 308 are sufficiently low that it can be battery powered. Furthermore, the amount of data that need to be processed by the access control device 308 are significantly lowered than the processing carried out by the camera device 10, thereby making the power requirements of the access control device 308 to be significantly lower than the power requirements of the camera device 10. The proximity of the camera device 10 with the access control device 308 and the lower power requirements of the access control device 308 allow for the access control device 308 to be effectively powered by the power received wirelessly from the camera device 10.

It was further observed that the amount of access data generated by the access control device 308 is significantly low to allow it to be transmitted wirelessly to another device. For example, the amount of access data is significantly lower than the amount image data generated by the camera device 10. The low amount of access data allows for effective wireless data communication between the camera device 10 and the access control device 308. The low amount of access data may also allow a low-power, short range communication protocol to be used while ensuring effective communication between the camera device 10 and the access control device 308. Accordingly, the access control device 308 may operate fully wirelessly (i.e. without requiring a wired connection for data communication with an external device and for receiving power).

The access control device 308 may have a form factor that is similar to existing access control devices. For example, the access control device 308 may have the form of a door reader/controller that is placed in proximity of a doorway. Alternatively, the access control device 308 may have the form of a wireless lock that is attached directly to a door.

Figure 4A:
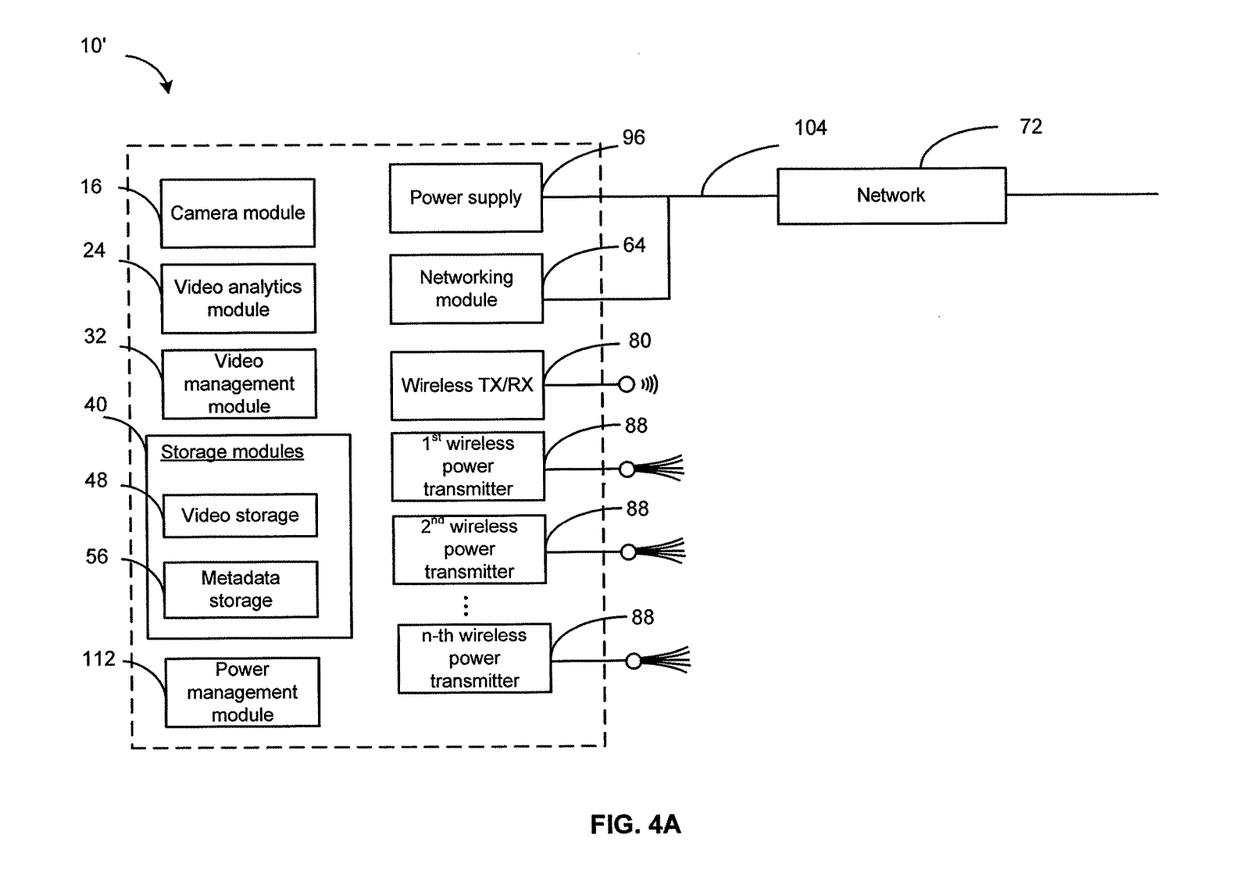
FIG. 4A illustrates a block diagram of a camera device according to an alternative example embodiment.

Referring now to FIG. 4A, therein illustrated is a block diagram of a camera device 10' according to an alternative example embodiment. The alternative camera device 10' includes the same operational module as the camera device 10 illustrated in FIG. 1 and the description provided herein regarding these modules are also applicable to the alternative camera device 10'. The alternative camera device 10' is different in that it includes a plurality wireless power transmitters 88. In the illustrated example, the alternative camera device 10' includes n wireless power transmitters 88. Power supplied to each of the plurality of power transmitters 88 may be controlled by the power management module 112.

The plurality of power transmitters may each be used to power different sets of one or more sensing devices 208 and/or access control devices 308. For example, the sensing devices 208 and/or access control devices 308 may be sparsely located such that a single power transmitter 88 cannot effectively provide power to all of the sensing devices 208. The wireless transceiver 80 of the alternative camera device 10' may be used for simultaneous data communication with a plurality of sensing devices 208 and/or access control devices 308 to which the alternative camera device 10' is transmitting power. For example, an appropriate multiplexing scheme may be used to maintain data communication with each of the plurality of sensing devices and/or access control devices 308.

In one example embodiment, at least one of the wireless power transmitters 88 of the alternative camera device 10' is pivotable so as to change an orientation of the wireless power transmitters 88. For example, a wireless power transmitter 88 may be pivoted to be sufficiently aligned with an external sensing device 208 or access control device 308 so as to effectively transmit power to that external device.

Figure 4B:
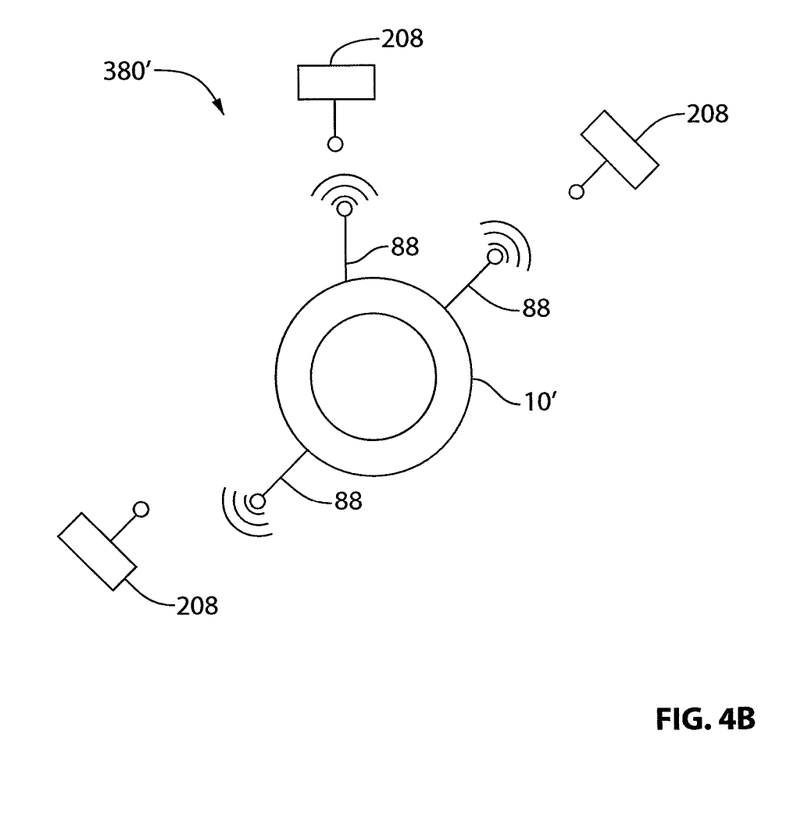
FIG. 4B illustrates a block diagram of a schematic diagram of an example deployment of the alternative camera device according to one example embodiment.

Referring now to FIG. 4B, there illustrated is a schematic diagram of an example deployment 380 of an alternative camera device 10' according to one example embodiment. An example alternative camera device 10' having a circular form factor is provided. The example alternative camera device 10' is a multi-transmitter camera and includes three wireless power transmitters 88. Three sensing devices 208 (or access control devices 308) are located around the camera device 10'. Each of the wireless power transmitters 88 are aligned with the location of a sensing device 208 so as to provide wireless power to that sensing device 208.

According to various example embodiments, one or more of the wireless power transmitters 88 are angularly pivotable so as to be radially aligned with the location of a sensing device 208.

Figure 5:
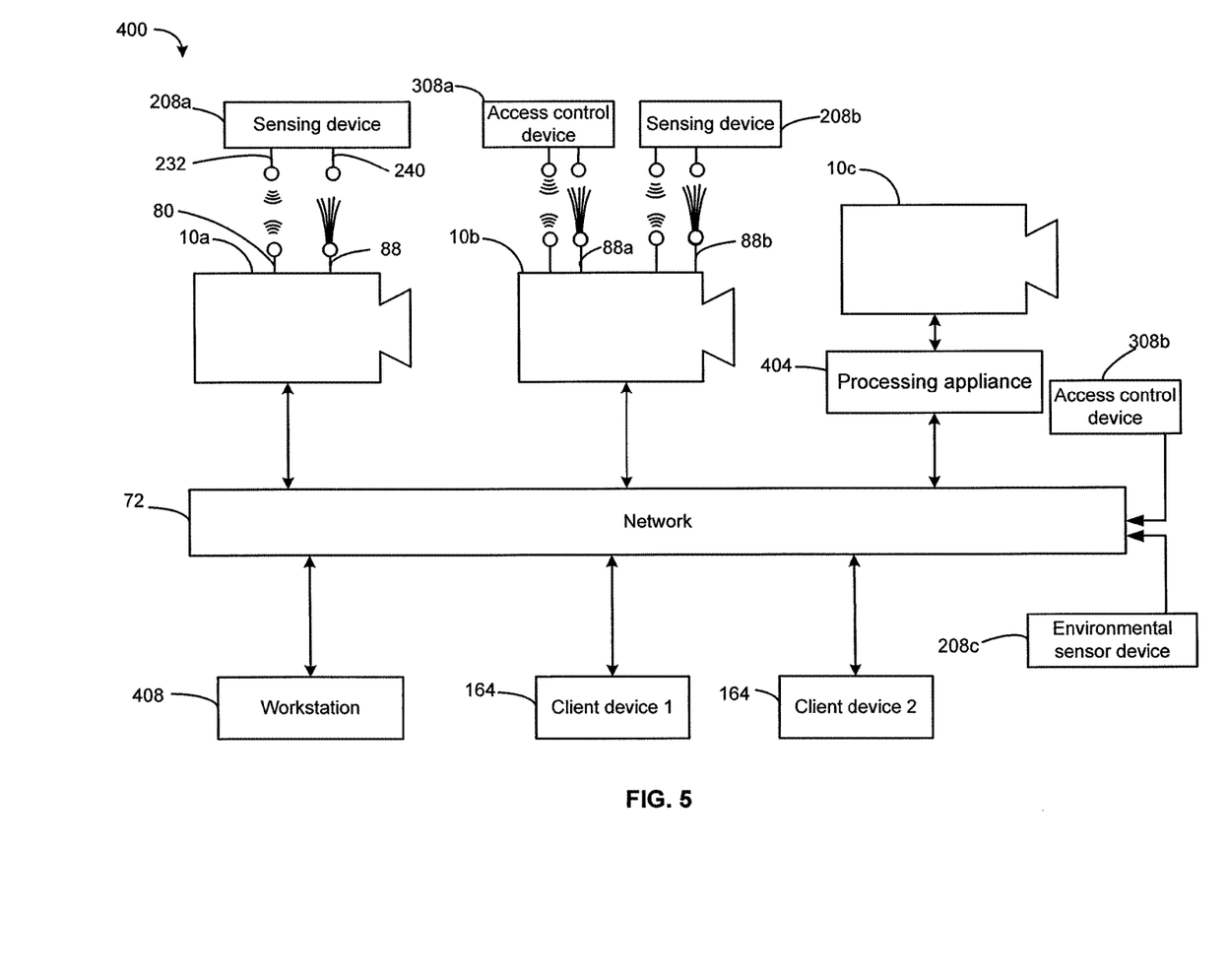
FIG. 5 illustrates a block diagram of connected devices of a combined video surveillance and access control system according to one example embodiment.

Referring now to FIG. 5, therein illustrated is a block diagram of connected devices of a combined video surveillance and access control system 400 according to one example embodiment.

The combined system 400 includes at least one camera device. In the example illustrated FIG. 4, a first camera device 10a, a second camera device 10b, and a third camera device 10c are each connected to the network 72. Image data and/or metadata generated by the camera devices 10a, 10b, and 10c are transmitted to other network-connected devices over the network 72.

In the illustrated example, the third camera device 10c is connected to the network 72 through a processing appliance 404. The processing appliance 404 is operable to process the image data outputted by the third camera device 10c. The processing appliance 404 includes one or more processors and one or more memory devices coupled to the processor. The processing appliance 404 may also include one or more network interfaces.

The first camera device 10a is in data communication with a first sensing device 208a using their respective wireless transceivers 80, 232. Sensed data generated by the sensing device 208a is transmitted over the network 72 via the first camera device 10a. The first camera device 10a further transmits power wirelessly from its wireless power transmitter 88. The transmitted power is received at the sensing device 240 of the first sensing device 208a, which may be used to charge its one or more batteries or energy storage devices.

The second camera device 10b is in data communication with a first access control device 308a and a second sensing device 208b. It will be understood that although two antennas are illustrated, a single wireless transceiver 80 in the second camera device 10b may be simultaneously in data communication with the first access control device 308a and the second sensing device 20b. For example, any appropriate multiplexing scheme may be used to maintain data communication with the access control device 308a and the second sensing device 20b. Access data generated by the first access control device 308a and sensed data generated by the second sensing device 208b is transmitted over the network 72 via the second camera device 10b.

In one example embodiment, a single wireless power transmitter transmits power wirelessly to both the first access control device 308a and the second sensing device 208b.

In another example embodiment, the second camera device 10b is multi-transmitter device, as described herein with reference to FIG. 4A, and includes a first wireless power transmitter 88a and a second wireless power transmitter 88b. The first wireless power transmitter 88a is configured to transmit wireless power to be received by the first access control device and the second wireless power transmitter 88b is configured to transmit wireless power to be received by the second access control device 208b.

The third camera device 10c is not transmitting wireless power. The third camera device 10c may be a standard IP camera that does not have wireless power transmission capabilities.

The system 400 may further includes a second access control device 308b, which is in direct connection with the network 72. For example, the second access control device 308b may be connected to the network 72 using a standard network connection, such as ethernet. Similarly, the system 400 may further include a third sensing device 208c which is in direct connection with the network 72.

The combined system 400 includes at least one workstation 408 (e.g. server), each having one or more processors. The at least one workstation 408 may also include storage memory. The workstation 408 receives image data from at least one camera device 10 and performs processing of the image data. The workstation 408 may further send commands for managing and/or controlling one or more of the camera devices 10. The workstation 408 may receive raw image data from the camera device 10. Alternatively, or additionally, the workstation 408 may receive image data that has already undergone some intermediate processing, such as processing at the camera device 10 and/or at a processing appliance 404. The workstation 408 may also receive metadata from the image data and perform further processing of the image data.

The workstation 408 may also perform management of the one or more access control devices 308. For example, the workstation 408 may collect access data from a plurality of access control devices 308 and monitor use of physical token to gain access to a plurality of protected assets. The workstation 408 may also manage access rules for a plurality of user identities and token identifiers.

According to some example embodiments, the workstation 408 may perform video surveillance and access control management in combination.

The video capture and playback system 400 further includes at least one client device 164 connected to the network 72. The client device 164 is used by one or more users to interact with the combined system 400. Accordingly, the client device 164 includes at least one display device and at least one user input device (for example, mouse, keyboard, touchscreen, joy stick, microphone, gesture recognition device, etc.). The client device 164 is operable to display on its display device a user interface for displaying information, receiving user input, and playing back image. The client device 164 may also be operable to display access control information and receive user input for changing access rules. For example, the client device may be any one of a personal computer, laptops, tablet, personal data assistant (PDA), cell phone, smart phone, gaming device, and other mobile and/or wearable devices.

Referring back to FIG. 2, the wireless power transmitter 88 transmits wireless power over an effective powered space. The effective powered space refers to the space in which a wireless power receiver 240 may be located and effectively receive the wirelessly transmitted power. A wireless power receiver 240 may be considered to be effectively receiving wireless power if the power at the receiver 240 exceeds a predetermined power threshold. Alternatively, a wireless power receiver 240 may be considered to be effectively receiving wireless power if the power at the receiver 240 induces a current in the receiver 240 that exceeds a predetermined current threshold.

According to various example embodiments, the field of view of the camera device 10 substantially overlaps with the effectively powered space of the wireless power transmitter 88. The field of view of the camera device 10 may be fully encompassed within the effectively powered space of wireless power transmitter 88. The field of view of the camera device 10 may be fully encompassed in that the effectively powered space occupies a larger space than the field of view. However, it will be understood that the field of view of the camera device 10 may extend past the outer limit of the effectively powered space based on a distance from the camera device 10.

By ensuring that the field of view of the camera device 10 is fully encompassed within the effectively powered space of the wireless power transmitter 88, any object that falls within the field of view will also be within effectively powered space of the wireless power transmitter 88 and can receive wireless power therefrom (so long as the distance of the object does not exceed the outer limit of the operational space). This may facilitate installation of a sensed device 208 or access control device 308 in that the installer only needs to place the sensed device 208 or access control device 308 within the field of view of the camera device 10 to ensure that the device 208 or 308 will be properly receiving wireless power from the camera device.

According to various example embodiments wherein the optical unit of the camera device 10 is pivotable to change the field of view of the camera device 10, the wireless power transmitter 88 is configured to maintain the overlap of the field of view with the operational space. The wireless power transmitter 88 may be configured to maintain the field of view being fully encompassed with the effectively powered space over the range of pivotable motion of the optical unit of the camera. Examples of cameras with a pivotable optical unit include a dome camera and a pan-tilt-zoom camera.

In one example embodiment, the wireless power transmitter 88 transmits power directionally. Accordingly, the operational space of the wireless power transmitter is defined by an effective power coverage cone. The wireless power transmitter 88 and the optical unit of the camera module 16 may be substantially aligned so that the field of view of the camera device 10 overlaps with the power coverage cone. The alignment may be such that the field of view of the camera device is fully encompassed within the power coverage cone.

Figure 6:
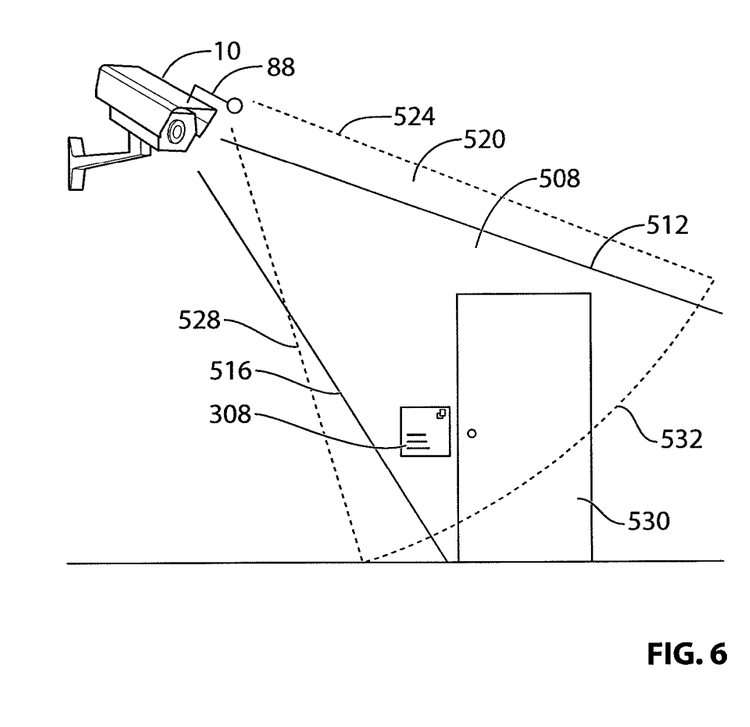
FIG. 6 illustrates a schematic diagram of an example deployment of a camera device and access control device.

Referring now to FIG. 6, therein illustrated is a schematic diagram of an example deployment 500 of a camera device 10 and an access control device 308. The camera device 10 has a field of view 508, which may be substantially conical. In the illustrated example, the field of view 508 is defined by its upper boundary 512 and lower boundary 516. The wireless power transmitter 88 transmits power directionally over a power coverage cone 520 that is defined by its upper boundary 524, lower boundary 528 and outer limit 532. It will be appreciated that the field of view 508 is fully encompassed within the power coverage cone 520 (but for a space close to the optical unit of the camera device 10 and a space outside of the outer limit 532).

The camera device 10 is oriented so as to capture a doorway 530, which is the protected asset. The access control device 308 is located proximate to the doorway 530 and controls the locking and unlocking of the door of the doorway 530. The access control device 308 is located within the field of view 508 of the camera and within the outer limit 532. Since the field of view 508 is fully encompassed within the power coverage cone 520, the access control device 308 is located within the operational space of the wireless power transmitter 88 of the camera device 10 and can receive power therefrom.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A combined video surveillance and access control system comprising:
   an access control device comprising:
      a lock controller for selectively controlling actuation of a physical lock between a locked state and an unlocked state;
      a sensor operable for sensing an occurrence of a presence of a machine readable physical token and for reading an identifier of the physical token;
      a transceiver for wirelessly transmitting access data generated based on the presence of the physical token and the identifier read by the sensor;
      at least one battery for supplying power to the lock controller, the sensor and the transceiver; and
      a wireless power receiver operable for receiving wirelessly transmitted power and to charge the at least one battery using the received power; and
   a camera device comprising:
      at least one camera module operable for capturing a scene corresponding to a field of view of the camera and for generating image data of the captured scene;
      a transceiver operable for receiving the access data transmitted from the battery-powered physical access control device;
      a networking module operable for transmitting the image data and access data to an external networked device;

a wireless power transmitter operable for transmitting power wirelessly to the wireless power receiver of the access control device; and at least one power supply operable for receiving power over a wired connection and supplying power to the camera, the transceiver, the network module and the wireless power transmitter.

2. The system of claim 1, wherein the access control device further comprises a lock actuator being controlled by the lock controller, said actuator being powered by the at least one battery and being operable for selectively actuating the physical lock between the locked state and the unlocked state.

3. The system of claim 1, wherein the networking module transmits the image data and the access data to the external networked device over the wired connection.

4. The system of claim 3, wherein the external networked device comprises an access control management system and wherein the access control device is in communication with the control management system only via the camera device.

5. The system of claim 3, wherein the access control device is free of a wired network connection with another network device.

6. The system of claim 1, wherein image data generated at a given time is logically associated to the access data generated at the same time by the access control device when transmitting the image data and the access data to the external networked device.

7. The system of claim 1, wherein the camera device further comprises a video analytics module operable for performing video analytics on the image data and determining an occurrence of a video analytics event based on a combination of one or more results of the performed video analytics and access data received from the access control device.

8. The system of claim 1, wherein the transceiver of the camera device is further operable for receiving information pertaining to a battery status of the at least one battery of the access control device; and
wherein the wireless power transmitter is operable for adjusting the transmission of wireless power to the access control device based on the received information pertaining to the battery status.

9. The system of claim 1, wherein an effective powered space of the wireless power transmitter of the camera device substantially overlaps with the field of view of the camera module.

10. The system of claim 9, wherein the camera module is pivotable and wherein the wireless power transmitter pivots with the camera module to maintain overlap of the power coverage cone with the field of view.

11. The system of claim 10, wherein an asset to which access is being controlled by the access control device is viewable within the field of view of the camera module.

12. A camera device comprising:
at least one camera module operable for capturing a scene corresponding to a field of view of the camera module and for generating image data of the captured scene;
at least one wireless power transmitter operable for transmitting wireless power to a battery-powered external sensing device;
a transceiver operable for receiving from the external sensing device sensed data pertaining to at least one condition sensed by the external sensing device;
a networking module operable for transmitting the image data and data pertaining to the at least one sensed condition to an external networked device; and
at least one power supply operable for receiving power over a wired connection and supplying power to the camera module, the transceiver, the networking module and the wireless power transmitter,
wherein an effective powered space of the wireless power transmitter of the camera device substantially overlaps with the field of view of the camera module.

13. The camera device of claim 12, wherein the networking module transmits the data to the external networked device over the wired connection.

14. The camera device of claim 12, wherein the image data generated at a given time is logically associated to sensed data generated at the same time by the external sensing device when transmitting the image data and sensed data to the external networked device.

15. The camera device of claim 12, further comprising a video analytics module operable for performing video analytics on the image data and determining an occurrence of a video analytics event based on a combination of one or more results of the performed video analytics and the sensed data.

16. The camera device of claim 12, wherein the transceiver is further operable for receiving information pertaining to a battery status of the external sensing device and wherein the wireless power transmitter is operable for adjusting the transmission of wireless power to the external sensing device based on the received information pertaining to the battery status.

17. The camera device of claim 12, wherein the camera module is pivotable and wherein the wireless power transmitter pivots with the camera module to maintain overlap of the power coverage cone with the field of view.

18. A camera device comprising:
at least one camera module operable for capturing a scene corresponding to a field of view of the camera module and for generating image data of the captured scene;
at least one wireless power transmitter operable for transmitting wireless power to a battery-powered external sensing device;
a transceiver operable for receiving from the external sensing device sensed data pertaining to at least one condition sensed by the external sensing device;
a networking module operable for transmitting the image data and data pertaining to the at least one sensed condition to an external networked device;
at least one power supply operable for receiving power over a wired connection and supplying power to the camera module, the transceiver, the networking module and the wireless power transmitter,
wherein the camera device comprises a plurality of wireless power transmitters, each transmitter being operable for directionally transmitting wireless power,
wherein at least one of the plurality of wireless power transmitters is pivotable to change the space occupied by its power coverage cone.

* * * * *